United States Patent [19]

Fujisawa

[11] Patent Number: 5,363,429
[45] Date of Patent: Nov. 8, 1994

[54] RADIO TELEPHONE DEVICE CAPABLE OF IDENTIFYING AN INTERRUPTING CALLER AND TELEPHONE SYSTEM USING THE SAME

[75] Inventor: Akiko Fujisawa, Machida, Japan

[73] Assignee: Kabushiki Kaisha Toshiba, Kawasaki, Japan

[21] Appl. No.: 887,005

[22] Filed: May 22, 1992

[30] Foreign Application Priority Data

May 23, 1991 [JP] Japan ................................ 3-118374

[51] Int. Cl.[5] .................... H04M 11/00; H04M 1/00
[52] U.S. Cl. ................................ 379/58; 379/57; 379/59; 379/61; 379/355
[58] Field of Search ................ 379/57, 58, 59, 61, 379/355, 356, 63, 88; 455/68

[56] References Cited

U.S. PATENT DOCUMENTS

| | | | |
|---|---|---|---|
| 4,129,749 | 12/1978 | Goldman | 379/58 |
| 4,674,111 | 6/1987 | Monet et al. | 379/58 |
| 4,829,554 | 5/1989 | Barnes et al. | 379/58 |
| 4,908,853 | 3/1990 | Matsumoto | 379/355 |
| 5,058,150 | 10/1991 | Kang | 379/58 |
| 5,063,588 | 11/1991 | Patsikas et al. | 379/57 |
| 5,070,521 | 12/1991 | Warner | 379/58 |
| 5,090,051 | 2/1992 | Muppidi et al. | 379/61 |
| 5,117,449 | 5/1992 | Metroka et al. | 379/58 |
| 5,148,473 | 9/1992 | Freeland et al. | 379/59 |
| 5,155,759 | 10/1992 | Saegusa et al. | 379/61 |
| 5,231,657 | 7/1993 | Umemoto et al. | 379/61 |

OTHER PUBLICATIONS

Ballard, et al, "Cellular Mobile Radio as an Intelligent Network Application", Electrical Communication, vol. 63, #4, 1989.
Goodman, "Trends in Cellular and Cordess Communications" IEEE Communications Magazine, Jun. 1991.
Cellular One, "Personal Rates" Nov. 1991.

*Primary Examiner*—Curtis Kuntz
*Assistant Examiner*—William Cumming
*Attorney, Agent, or Firm*—Finnegan, Henderson, Farabow, Garrett & Dunner

[57] ABSTRACT

Information on the telephone number of a terminal which made an interrupting call during telephonic communication is detected, displayed on a display and stored in memory. After completion of the telephone communication, the information on the telephone number stored in the memory is retrieved. By depressing "SND" key when the retrieved telephone number is being displayed, a call is automatically placed on the basis of the telephone number. Even if an interrupting call is received, the interrupter is recognized without stoppage of the ongoing telephonic communication and the interrupter can be accessed later with a simple operation.

2 Claims, 9 Drawing Sheets

RADIO TELEPHONE DEVICE CAPABLE OF IDENTIFYING AN INTERRUPTING CALLER AND TELEPHONE SYSTEM USING THE SAME

BACKGROUND OF THE INVENTION

1. Field of the Invention

The present invention relates to a telephone device and system using the device capable of transmitting and receiving information on telephone numbers together with voice information, and more particularly to improvements to the control function of the telephone device and system using the device capable of informing a party during telephonic communication that a third party has placed a call to the party, by using the information on the third party's telephone number sent together with the voice information.

2. Description of the Related Art

A service which allows an incoming call from a third party to be received by a first party during telephonic communication with a second party is known. For example, Nippon Telephone and Telegram Corporation (NTT) has been providing a service called "catchphone" as an additional function of telephone devices.

This service is achieved by a control process comprising
steps of informing, with a calling tone, a first party who has been talking to a second party that there is an incoming call from a third party, detecting that the first part has depressed a predetermined key, and switching the communication channel to the third party while holding the communication channel with the second party.

However, according to the conventional service of this type, even if it is informed that there is an incoming call from a third party during communication with the second party, the called (first) party cannot be informed who the third party is as long as the called party does not respond to the incoming call.

Therefore, the called party must respond to the incoming call to confirm who the caller is, and decide whether to continue the talk with the third party or say a simple message to the third party such as "I will call you later" and resume the communication with the second party.

If the third perry's incoming call involves an emergency matter or is made by an important person for the called party, it is advantageous to interrupt the ongoing telephonic communication with the second party so as to respond to the third party's call.

However, if the incoming call is not an important one, the interruption of the ongoing communication usually causes inconvenience.

In order to respond to the incoming call from the third party, the called party must switch the connection from party of ongoing communication (second party) to the third party, which would hinder smooth telephonic communication with the second party.

When the connection is switched to the third party, it is required to send an interrupting tone to the second party and to place the second party in a mute state during holding, which gives an uncomfortable feeling to the second party.

As described above, when the service function such as "catchphone" is utilized in the conventional telephone device, the called party cannot confirm who is the interrupting party unless the called party actually responds to the call. Therefore, the ongoing communication must be interrupted to switch the connection to the interrupting person even when the called party merely desires to confirm the name of the interrupting party, which gives an uncomfortable feeling to the party to whom the ongoing communication is being made.

Such uncomfortable feeling can be alleviated to some extent, for example, by making a short answer such as "I will call you later" to the third party and then resuming the ongoing communication immediately.

However, even if the incoming call from the third party is responded to in the above manner, it is necessary to find out the telephone number of the third party and to dial that number when calling is made to the third party later. It takes time to find out the telephone number and there is a possibility to wrong dialing. Thus, there is a case in which smooth access to the third party is difficult.

SUMMARY OF THE INVENTION

It is therefore an object of the present invention to provide a telephone device and a telephone system which is capable of identifying a third party without responding to an incoming call when there is the incoming call from the third party during telephonic communication with another party, and avoiding unnecessary responding to the incoming call as much as possible to thereby realize comfortable communication.

It is another object of the present invention to provide a telephone device and a telephone system which is, when there is an incoming call from a third party during telephonic communication with another party and the incoming call is not responded to, capable of placing a call to the third party later reliably with a simply operation.

It is a further object of the present invention to provide a telephone device suitable for constructing a telephone system which is capable of confirming at any time the third parties who have made interrupting calls irrespective of whether the interrupting calls are responded and capable of smooth accessing to a desired one of the third parties as required.

In order to achieve the first-mentioned object, a radio telephone device according to the present invention comprises receiving means for receiving signals during communication with another party, the signals including the telephone number of a third party; detecting means for detecting the telephone number out of the signals; and informing means for informing a party thereof of the telephone number.

In order to achieve the second and third-mentioned objects, a radio telephone device according to the present invention comprises receiving means for receiving signals during communication with another party, the signals including the telephone number of a third party; detecting means for detecting the telephone number out of the signals; display means for displaying the telephone number of the third party; storing means for storing the telephone number; and calling means for placing a call to the third party having the telephone number.

A telephone system using the telephone device according to the present invention comprises a control terminal having an exchanging function; a plurality of mobile telephone switching offices connected to the control terminal; a plurality of radio telephone sets each to be connected to one of the mobile telephone switching offices via radio channels and provided with a display unit, for sending a calling signal including their own telephone numbers; wherein the control terminal is provided with means for, when the control terminal connects a first telephone set to a land line and receives a calling signal from a second radio telephone set, detecting a telephone number out of the calling signal and transmitting the telephone number to one of the mobile telephone switching offices, wherein the mobile telephone switching offices are provided with means for detecting the telephone number of the second radio telephone set and means for generating control information to which the detected telephone number is added, wherein the base stations are provided with means for sending the control information to the first radio telephone set, and wherein the first radio telephone set is provided with means for detecting the telephone number of the second radio telephone set out of the control information, and means for causing the detected telephone number to display on the display unit of the second radio telephone set.

According to the first aspect of the present invention, a terminal which has received an interrupting call from a third party during telephonic communication with another party demodulates and displays the telephone number of the third party, so that the operator of the terminal can recognize the interrupting terminal (the third party) without responding to the interrupting call.

Therefore, the operator can maintain the telephonic communication until the communication with another party is completed without responding to the third party's call when the operator judges that if it is not an emergency, so that comfortable telephonic communication can be made without stopping the ongoing communication even when a service such as "catchphone" service is provided.

According to an second aspect of the present invention, when there is an interrupting call from a third party during telephonic communication with another party, the telephone number of the third party is detected from control information which is informed by the control terminal, displayed on a display unit and stored in a memory.

The memory for storing the telephone number of the third party includes a CAS which stores a single telephone number to which a call can be placed by depression of a particular key and a RAM which includes a dedicated telephone number information storage memory for storing a plurality of telephone numbers and provided separately from the CAS.

In the second aspect of the present invention, the telephone number of the third party is displayed when there is an interrupting call during telephonic communication with another party and the display coincides with the content in the CAS. Accordingly, the third party whose telephone number is under display can be easily accessed on the basis of the data in the CAS only by the depression of a key, for example, "SND" key.

Further, in the second aspect of the present invention, it is so controlled that a desired third party telephone number is read from the telephone number information storage memory and displayed by a depression of predetermined retrieval key. The desired third party telephone number thus displayed can again be stored in the CAS.

By this control, and third party which made the interrupting call can be retrieved by using the retrieval key. To call the third party thus retrieved, only depressing the "SND" key is required because the telephone number displayed coincides with the contents of the CAS.

Therefore, when it is desired to call the third party after the termination of the ongoing telephonic communication, no complicated operation is required such as dialing the third party telephone number or pressing push buttons while finding out the telephone number of the third party.

According to the telephone device of the present invention, when there is an interrupting call from a third party during telephonic communication, the telephone number of the third party is informed by the network side and is detected and displayed. The telephone number information of the third party thus detected is stored. This telephone number is retrieved in accordance with depression of a predetermined key, and displayed. The third party is called readily on the basis of the telephone number under current display.

DESCRIPTION OF THE PREFERRED EMBODIMENTS

Figure 1:
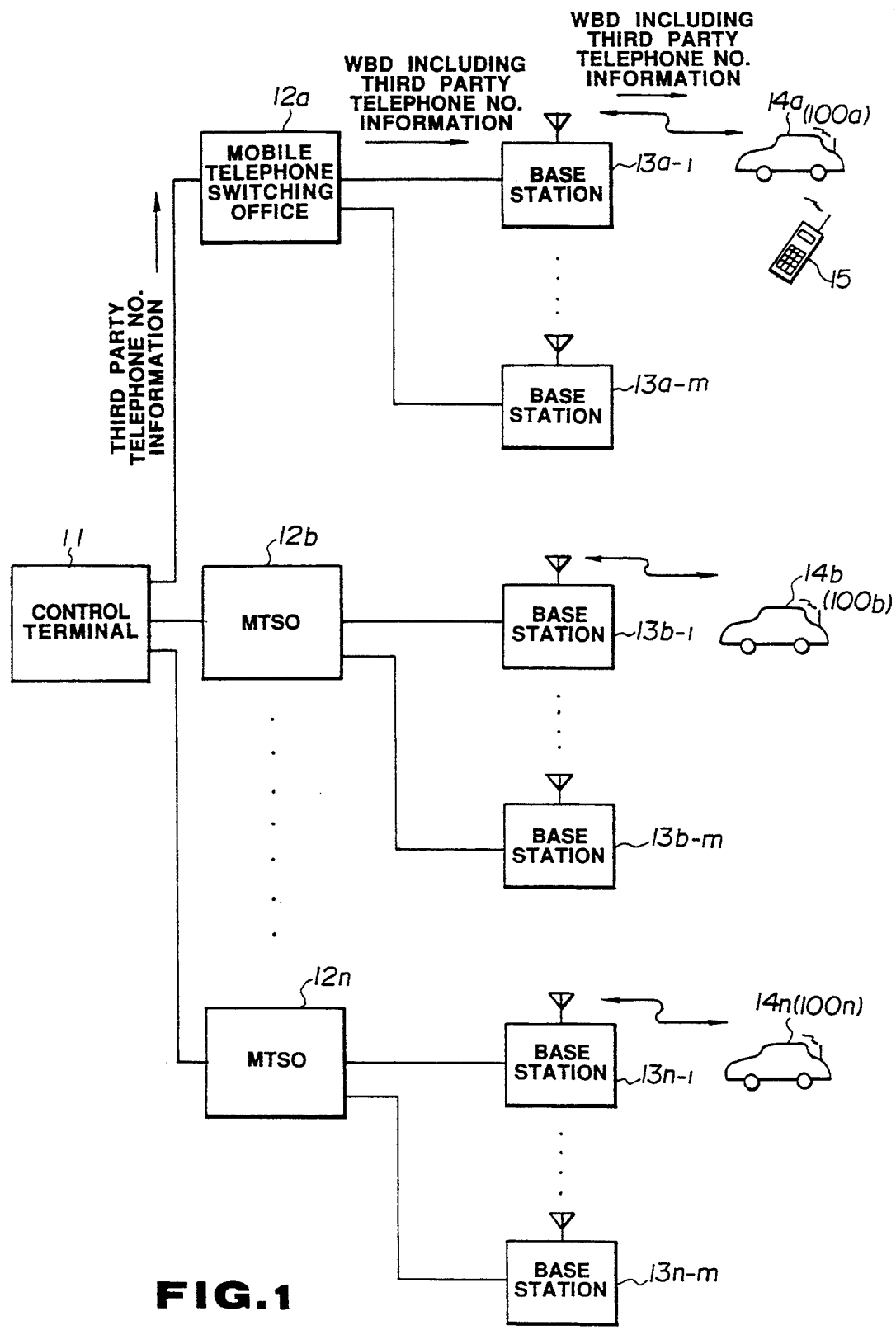
FIG. 1 is a block diagram of a telephone system according to one embodiment of the present invention.

Referring to FIG. 1, a telephone system comprises a control terminal 11 to which base stations 13a-1–13a-m through 13n-1–13n-m are connected by wires via associated mobile telephone switching offices (MTSO) 12a–12n.

Each base station is installed in each cell site (radio zone). A plurality of the base stations (or cell sites) are divided into a plurality of cell site groups. An MTSO is assigned to each group.

Communication control over car telephone devices 100a–100n or a portable radio telephone device 15 are performed through associated base stations and MTSOs and the control terminal 11. Car telephone devices 100a–100n mounted on the cars 14a–14n are connected to the base stations 13a-1–13a-m through 13n-1–13n-m by radio channels.

Figure 2:
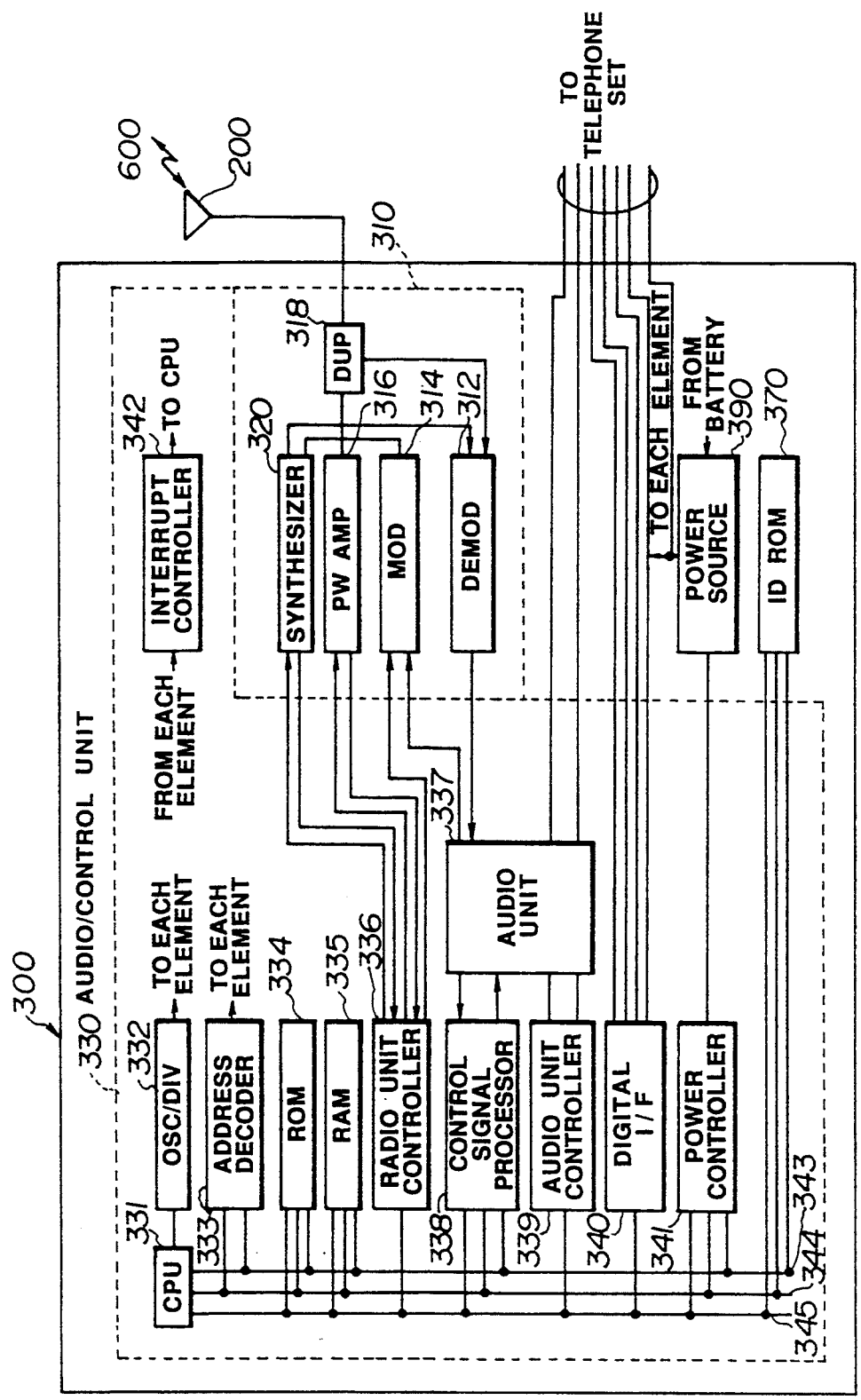
FIG. 2 is a block diagram of a radio device of a car telephone device contained in the telephone system shown in FIG. 1.
Figure 3:
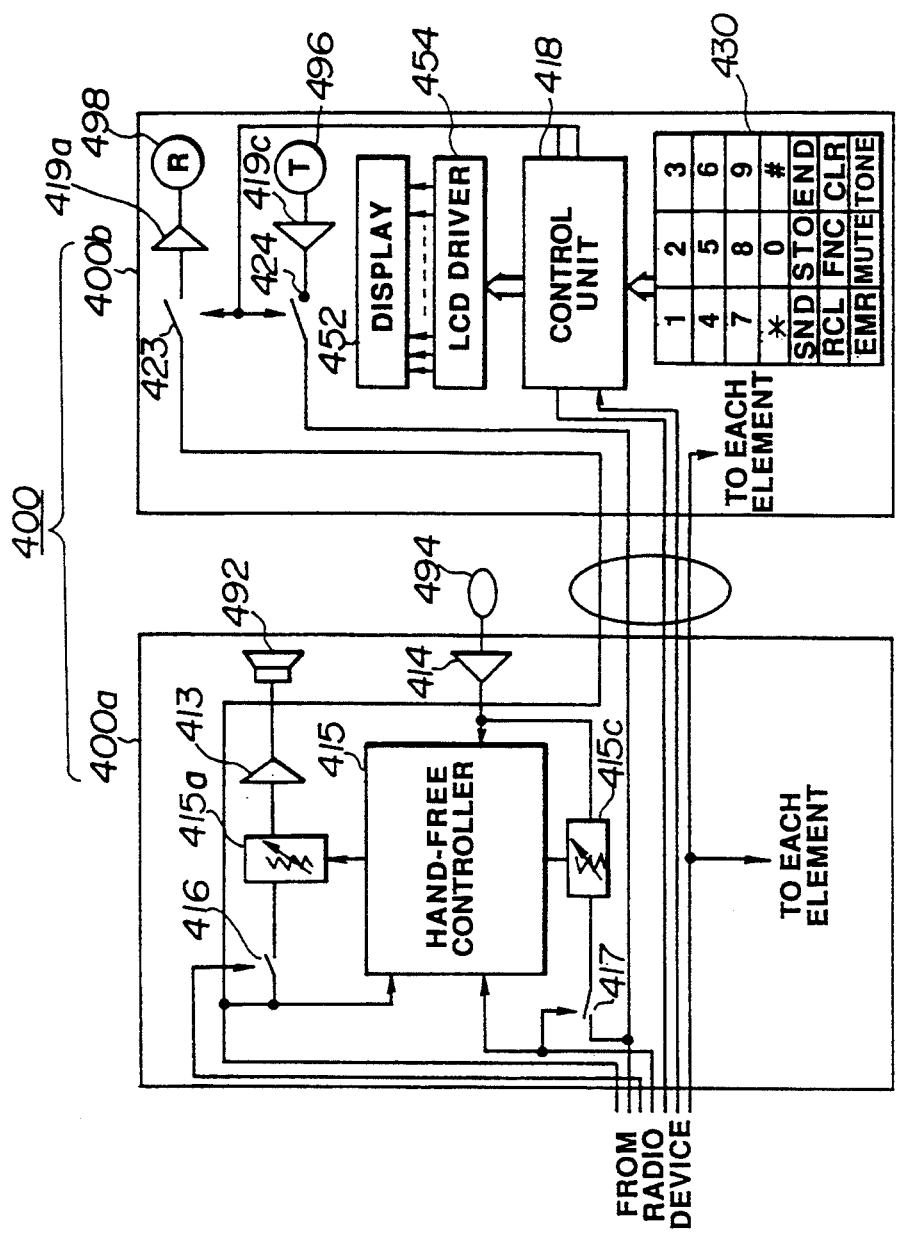
FIG. 3 is a block diagram of a telephone set of the car telephone device contained in the telephone system of FIG. 1.

For example, car telephone device 100a mounted on car 14a which is moving in a first cell cite group can make telephonic communication with car telephone device 100b mounted on car 14b which is moving in a second cell cite group under the control of the control terminal Referring to FIGS. 2 and 3, the car telephone device 100a–100n comprises an antenna 200, a radio device 300 and a telephone set 400.

Antenna 200 is provided outside of car 14 while radio device 300 is mounted within a trunk of car 14. Telephone set 400 includes a telephone body 400a and a handset 400b which are placed near the driver's seat in car 14.

As shown in FIG. 2, radio device 300 establishes a radio channel 600 with base station 13 (see FIG. 1) through antenna 200, and mainly includes a radio unit 310 which transmits/receives signals to/from the base station, audio/control unit 330 which provides general control over the entire device, IDROM 370 which stores ID numbers and telephone numbers registered in the central office, and power source 390 which receives electric power from a battery mounted on car 14 and feeds Dower to the respective elements of the device 100. Radio unit 310 includes a demodulator 312, modulator 314, power amplifier 316, duplexer 318 and synthesizer 320.

Demodulator 312 demodulates a signal received from base station 13 through radio circuit 600, antenna 200 and duplexer 318. The received signal includes an audio signal, control signals (WBD to be described later in more detail), etc.

Modulator 314 modulates the carrier wave with an audio signal, control signals, etc., and outputs the modulated signal from audio/control unit 330.

Power amplifier 316 amplifies transmission/reception signals output from modulator 314. Duplexer 318 sends a signal received through radio circuit 600 and antenna 200 to demodulator 312 and sends to antenna 200 a signal received through modulator 314 and power amplifier 316.

Synthesizer 320 is a local oscillator for channel selection and designates a frequency to be demodulated by demodulator 312 and a frequency to be modulated by modulator 314.

Audio/control unit 330 includes a CPU 331, oscillator/frequency divider 332, address decoder 333, ROM 334, RAM 335, radio unit controller 336, audio unit 337, control signal processor 338, audio unit controller 339, digital interface 340, power source controller 341, and interrupt controller 342. Reference numeral 343 denotes, for example, a 8-bit data bus; 344, an address bus; and 345, a control bus.

CPU 331 provides general control over the entire audio/control unit 330.

Oscillator/frequency divider 332 feeds a clock signal to CPU 331 and timing signals obtained by dividing the clock signal to the respective elements concerned.

An address decoder 333 outputs predetermined signals to the respective elements concerned in accordance with instructions from CPU 331.

ROM 334 stores various programs required for the operation of CPU 331. RAM 335 stores various items of data involved in the processing by CPU 331.

Radio unit controller 336 controls radio unit 310 on the basis of instructions from CPU 331. For example, radio unit controller 336 designates a frequency which synthesizer 320 to designate, an amplification factor with which power amplifier 316 amplifies a signal, and a modulation factor with which modulator 314 modulates a signal. Controller 336 also receives an asynchronous signal output from synthesizer 320 and a detection signal output from power amplifier 316 and delivers them to CPU 331 for prevention of a wrong operation of the device.

Audio unit 337 sends control signals of the received signals demodulated by demodulator 312 to control signal processor 338 and telephone set 400. Audio unit 337 also sends to modulator 314 control signals from control signal processor 338 and an audio signal from telephone set 400. Audio unit 337 has the functions of forming the waveform of a control signal sent to control signal processor 338 and filtering the control signal to be sent to modulator 314.

Control signal processor 338 performs a bit and frame synchronization on the control signal output from audio unit 337, extracts as a parallel signal control data from the base station contained in the control signal which is a serial signal and sends to audio unit 337 the control data as the parallel signal to be sent to the base station 13 as a control signal which is a serial signal.

Audio unit controller 339 performs various control operations on audio unit 337. For example, audio unit controller 339 provides a switching and controlling operation for feeding a received signal from audio unit 337 to control signal processor 338 and telephone set 400, and-a switching and controlling operation for feeding and one of signals output from control signal processor 338 or telephone set 400 to audio unit 337.

Digital interface 340 provides an interfacing operation between radio unit 300 and telephone set 400.

Power source controller 341 provides control over power source 390. For example, power source controller 341 sets to various predetermined voltages a voltage fed from the battery (not shown) to power source 390 and feeds them to the respective elements concerned.

Interrupt controller 342 receives interrupt instructions from the respective elements concerned and interrupts CPU 331.

Telephone body 400a of telephone set 400 shown in FIG. 3 mainly includes amplifiers 413, 414; a hand-free controller 415; attenuators 415a, 415c; switches 416, 417; a hand-free microphone 494; a speaker 492; a hook switch (not shown); and an on/off switch (not shown). Amplifier 413 amplifies an audio signal from audio unit 337 of radio device 300 and outputs the resulting signal through speaker 492.

Amplifier 414 amplifies an audio signal from hand-free microphone 494 and sends it to audio unit 337.

Hand-free controller 415 controls the attenuation factor of attenuator 415a which attenuates a voice signal input to amplifier 413 and also the attenuation factor of attenuator 415c which attenuates a voice signal output from amplifier 414.

Switch 416 performs a switching operation for either outputting a voice signal from audio unit 337 through speaker 492 or not.

Switch 417 performs a switching operation for either sending a voice signal from hand-free microphone 494 to audio unit 337 or not. The switching operation of these switches 416, 417 is performed in accordance with a control signal from audio/control unit 330 of radio device 300.

The hook switch (not shown) detects the on or off state of handset 400b. This detected signal is sent to audio/control units 330 of radio device 300. The on/off switch (not shown) switches on/off the entire car telephone device 100. This switching signal is sent to power source of radio device 300.

Handset 400b mainly includes a control unit 418, amplifiers 419a, 419c; switches 423, 424; liquid crystal display 452; LCD driver 454; a key unit 430 of key pads; handset microphone 496; and handset receiver 498.

Control unit 418 provides general control over the entire handset 400b on the basis of control signals from audio/control units 330 of radio device 300, and sends control signals, etc., from key pad 430 to audio/control unit 330 of radio device 300.

Amplifier 419a amplifies a voice signal from audio unit 337 and outputs it through handset receiver 498.

Amplifier 419c amplifies a voice signal from handset microphone 496 and sends it to audio unit 337.

Switch 423 performs a switching operation for either outputting a voice signal from audio unit 337 through handset receiver 498 or not.

Switch 424 performs a switching operation for either outputting a voice signal from handset microphone 496 to audio unit 337 or not. The switching operations of these switches 423, 424 are controlled by control unit 418.

Liquid crystal display 452 includes a numeral display of several figures and displays having various functions. LCD driver 454 drives liquid crystal display 452 under control of control unit 418 to thereby make predetermined display.

Key unit 430 includes key pads for numerical keys "0"–"9" and functional keys "*", "#", "SND", "STO", "END", "RCL", "FNC", "CLR", "EMR", "MUTE", "TONE". When any one of the key pads is depressed, this fact is recognized by control unit 418.

Figure 4:
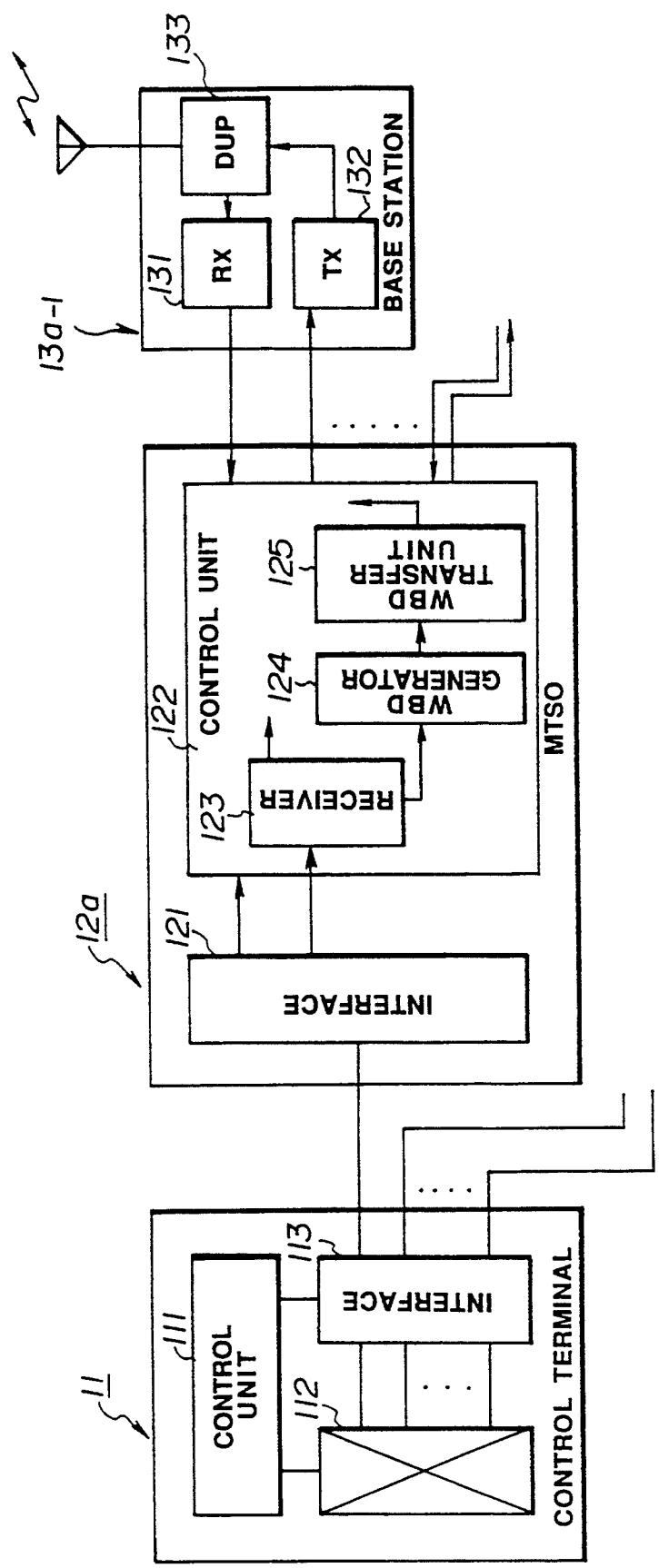
FIG. 4 is a block diagram illustrating a main portion of the telephone system of FIG. 1.

FIG. 4 shows construction of base stations 13a-1, mobile telephone switching offices 12a for supervising the base stations in each cell site group, and control terminal 11 for supervising mobile telephone switching offices provided in correspondence to cell sites (radio zones) in which cars 14a–14n mounting car telephone devices 100 are movable.

The mobile telephone switching offices 12b–12n and base stations 13a-2–13n-m omitted from FIG. 4 are similar to mobile telephone switching office 12a and base station 13a-1, respectively.

Referring to FIGS. 4 and the FIGS. 1–3, a telephonic operation performed between car telephone devices 100a and 100b of the present telephone system will be outlined below.

When a call is placed from, for example, car telephone device 100b, the operator at device 100b first goes off hook and keys in the telephone number of called car telephone device 100a through key unit 430 on handset 400h.

In that case, control unit 418 informs CPU 331 of the keyed-in key information through digital interface 340. Thus, CPU 331 drives control signal processor 338 to thereby cause processor 338 to generate the telephone number of the called terminal 100a corresponding to the keyed in information and to input the number information through audio unit 337 to modulator 314. Simultaneously, CPU 331 inputs to modulator 314 the telephone number of the telephone device including CPU 331 read out of IDROM 370 through control signal processor 338 and audio unit 337.

Modulator 314 modulates an input signal from audio unit 337 and sends the resulting signal to duplexer 318, which then sends the modulated signal from antenna 200 to radio circuit 600.

As described above, the inventive telephone device 100 sends to the called terminal a call signal with information on the telephone number of the called terminal and the telephone number of the telephone device 100.

This call signal is received by base station 13b-1 through radio circuit 600 and the corresponding antenna. The call signal is then input to mobile telephone switching office 12b through duplexer 133 and receiver 131. In mobile telephone switching office 12b, control unit 122 sends its received signal through interface 121 to control terminal 11.

In control terminal 11, control unit 111 extracts a signal from mobile telephone switching office 12b through interface 113 to thereby provide exchange control over switch unit 112 on the basis of the telephone number of the called terminal contained in the signal. In this exchange control, control unit 111 of control terminal 11 sends a call signal to mobile telephone switching office 12a to call car telephone device 100a, which is the called terminal at this time on the basis of the input signal from mobile telephone switching office 12b.

Mobile telephone switching office 12a sends this call signal to base station 13a-1, which then sends to radio circuit 600 the call signal from transmitter 132 to duplexer 133 and the corresponding antenna.

Car telephone device 100a receives the call signal from radio circuit 600 through antenna 200. This received signal is extracted by demodulator 312 through duplexer 318 and demodulated. Thereafter, the demodulated signal is input through audio unit 337 to control signal processor 338, which determines that the received signal is a call signal for telephone device 100a and informs CPU 331 of this fact.

CPU 331 drives audio control unit 339 on the basis of the informed fact to close, for example, switch 416 of telephone body 400a through audio unit 337 and to sound speaker 492 to thereby inform the arrival of the incoming call signal.

If in response to this incoming call, the operator at telephone device 100a performs an off-hook operation, this fact is recognized by control unit 418 of handset 400b. Control unit 418 closes, for example, switches 423, 424 on the basis of that recognition.

Thus, telephone device 100a is placed in a state where it can have telephonic communication with telephone device 100b which is the calling device 100b using handset microphone 496 and handset receiver 498.

In telephone devices 100a and 100b, when this telephonic communication is made, the voice signal received from antenna 200 is demodulated by demodulator 312 through duplexer 318, output as a voice signal from audio unit 337 to handset receiver 498 while the voice signal from handset microphone 496 is modulated by modulator 314 through audio unit 337, and sent from antenna 200 through duplexer 318.

While control over telephonic communication using handset 400b has been illustrated, switches 416, 417 of telephone body 400a may be closed to perform hand-free telephonic communication using speaker 492 and hand-free microphone 494, of course.

In the present telephone system, telephonic communication is established between telephone devices 100a and 100b by the above-mentioned control.

In parallel with such control provided during telephonic communication, for example, mobile telephone switching office 12a performs a channel switching operation and a power level control operation on car telephone device 100a under supervision. These control operations are normally performed by sending required control signals from mobile telephone switching office 12a to telephone device 100a via base station 13a-1. An example of these control signals is WBD (Wide Band Data).

One of the control operations of the inventive telephone system performed when there is an incoming telephone call placed by the third party (for example, car telephone device 100n) to car telephone device 100a which is now under telephonic communication is to inform telephone device 100a under communication of the telephone number of the third party. This control is realizable, for example, by using the WBD.

In the present telephone system, when the car telephone device 100a under communication receives an incoming call from telephone device 100n of the third party, it responds as follows.

The flow of signal from control terminal 11 to car telephone device 100a shown in the system structure of FIG. 1 represents the flow of a signal occurring due to arrival of an interrupting call from car telephone device 100n when car telephone device 100a already has had telephonic communication with another remote terminal. The operation of the present device will be described below.

If car telephone device 100a receives an incoming call from car telephone device 100n when telephone device 100a has had telephonic communication with car telephone device 100b as mentioned above, the call signal from car telephone device 100n is input to control terminal 11 through base station 13n-1 and mobile telephone switching office 12n.

In the control terminal 11 which has received the incoming call signal, control unit 111 recognizes that telephone device 100a is already during communication on the basis of the exchange control by switch unit 112 and sends a signal indicative of this recognition through interface 113 to mobile telephone switching office 12a.

In mobile telephone switching office 12a, control unit 122 receives that signal through interface 121 and then starts up a receiver 123, WBD generator 124 and WBD transfer unit 125.

Thus, receiver 123 receives information on the telephone number of the calling terminal 100n (information on the telephone number of the third party) fed from call terminal 100n from among signals extracted from control terminal 11 through interface 121.

WBD generator 124 generates WBD which incorporates information on the third party telephone number received by the receiver 123, and outputs it to WBD transfer unit 125.

Figure 5A:
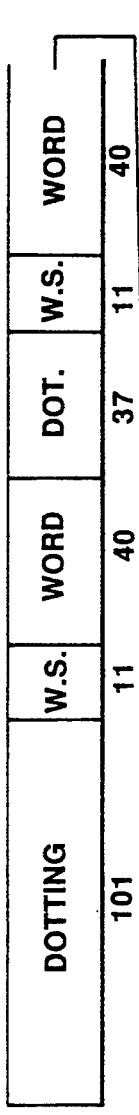
FIGS. 5(a), (b), (c) show one example of a format of WBD used in communication control over the telephone system shown in FIG. 1.
Figure 5B:
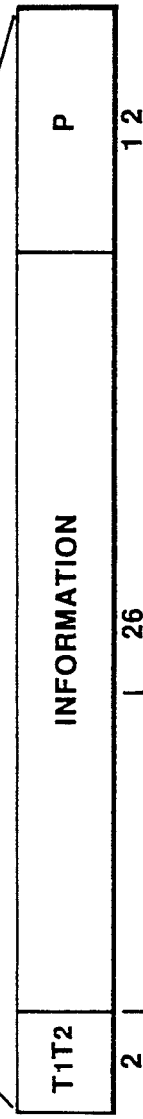

The WBD handled by WBD generator 124 is constructed in a format, for example, shown in FIG. 5 in which FIG. 5(a) shows the format structure of the overall WBD while FIG. 5(b) shows the structure of a word section in the format.

Figure 5C:

In the present telephone system, if there is an interrupting call placed by the third party (telephone device 100n) when telephone device 100a is in communication, WBD generator 124 of base station 12a incorporates the telephone number of the third party into the word of WBD (see FIG. 5(c)) and sends it to car telephone device 100a under communication.

In that case, as shown in FIG. 5(c), clearly declaring the transmission of information on the third party telephone number by attaching an information identification header before information on the third party telephone number ensures the receipt of the third party telephone number at the receiving end.

When WBD transfer unit 125 has received the WBD including the information on the third party telephone number, it sends the WBD to base station 13a-1, which then sends the WBD to car telephone device 100a through transmitter 132 and duplexer 133.

Figure 6:
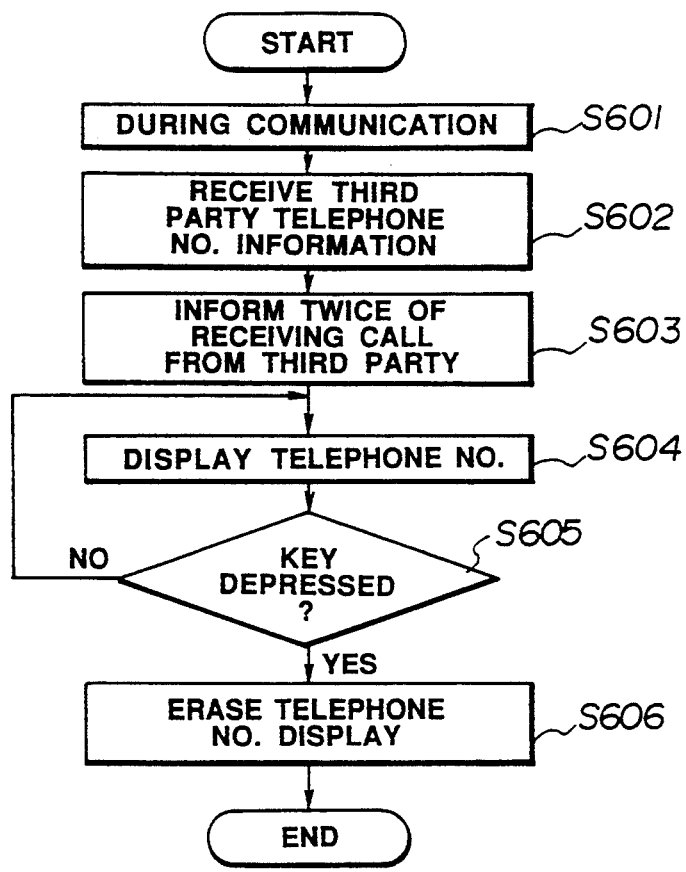
FIG. 6 is a flowchart illustrating an example of receipt of an incoming call during telephonic communication by the radio telephone device in the telephone system shown in FIG. 1.

The operation of car telephone device 100a responsive to the transmission of control signals from mobile telephone switching office 12a and base station 13a-1 will be described with reference to the flow chart of FIG. 6. In the appropriate timing, device 100a is in communication with telephone device 100b, as mentioned above. In this state (S601), telephone device 100a receives WBD from base station 13a-1 through antenna 200 (S602). Thereafter, it inputs the received signal to demodulator 312 through duplexer 318. Demodulator 312 demodulates this received signal and inputs the resulting signal to control signal processor 338 through unit 337.

Control signal processor 338 extracts the telephone number of car telephone device 100n as the third party telephone number information from the WBD which is received and demodulated, and informs CPU 331 of the telephone number. CPU 331 then transfers the third party telephone number through digital interface 340 to control unit 418 of handset 400b.

Control unit 418 sounds speaker 492, for example, twice, to thereby inform the operator of the arrival of an interrupting telephone call from the third party during the communication (S603).

Control unit 418 drives LCD driver 454 and displays on liquid crystal display 452 the telephone number of the third party as the telephone number of the calling terminal which has required the interruption (S604).

Subsequently, during display of the third party telephone number, control unit 418 monitors whether any one of keys in key unit 430 is depressed (S605).

While no key is being depressed (S605, NO), that display continues. If the depression of any key is recognized (S605, YES), its display is erased (S606).

As described above, in the inventive telephone system, when there is an interrupting call from the third party during the communication, the telephone number of the interrupter is demodulated and displayed by the telephone device which has received that interrupting call during the communication. Therefore, an operator, for example, at car telephone device 100a which has received the interrupting call can recognize the interrupting caller without stopping the existing telephonic communication with car telephone device 100b.

Thus, if the operator at telephone device 100a does not recognize the need to respond directly to the interrupting call, he can continue the telephonic communication maintained so far to thereby avoid giving an uncomfortable feeling which would otherwise occur due to stoppage of the communication to the terminal with which the operator has so far maintained the telephonic communication and hence to bring about smooth telephonic communication when a service such as "call waiting" or "catchphone" service is made.

The above embodiment discloses only a system structure which alerts the terminal for which there is an interrupting; call placed by the third party during; telephonic communication to this fact and which displays the telephone number of the third party.

As a second embodiment of the present invention, the system arrangement may be provided in which the received telephone number of the third party is stored as a list of during-communication interrupting call request terminals in a memory and when required, the list is retrieved and the appropriate third party is immediately accessed on the basis of the retrieved third party telephone number.

With this system, the memory used may be, for example, RAM 335 in radio device 300.

Figure 7:
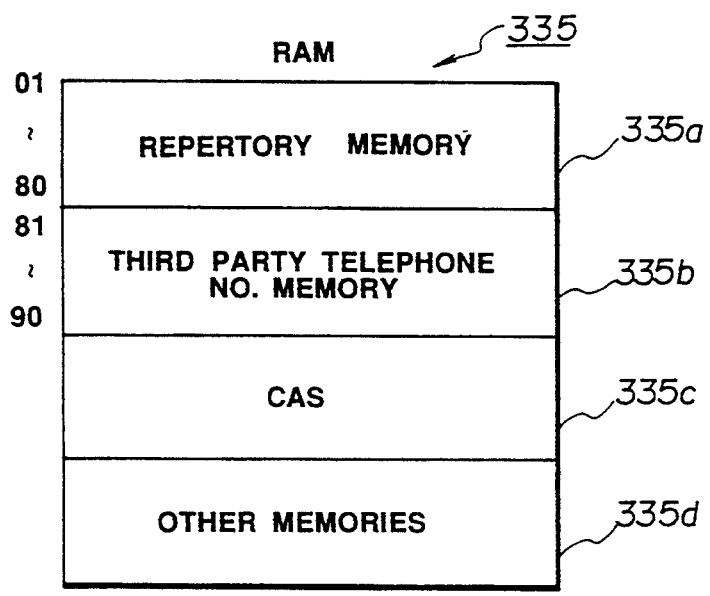
FIG. 7 shows a structure of a RAM provided in the radio telephone device of the telephone system according to a second embodiment of the present invention.

FIG. 7 shows the structure of RAM 335 used in the system as the second embodiment of the present invention and has a structure which ensures memory areas for repertory memory 335a, third party telephone number information storage memory 335b, a called-address sequence CAS 335c used as a buffer memory, etc.

In this second embodiment, the telephone number of car telephone device 100n which has placed an interrupting call during telephonic communication is extracted as the third party telephone number using the method described with reference to the previous embodiment, the extracted telephone number is stored temporarily in CAS 335c of RAM 335 and the data in CAS 335c is then stored in third party telephone number information memory 335b.

Usually, CAS 335c presupposes a redialing function and is used to store only one telephone number of the terminal called by the depression of the "SND" key or the like.

In the second embodiment, when there is an interrupting call from car telephone device 100n during telephonic communication, for example, an alarm tone is ringed twice, as mentioned above, and the telephone number of telephone device 100n is displayed on liquid crystal display 452. Since that telephone number is stored in RAM CAS 335c, only depression of the "SND" key after termination of the telephonic communication directly causes car telephone device 100n to be called on the basis of the data (the information on the third party telephone number now under display) in CAS 335c.

In this control, when a different user makes a new interrupting call, the information on the third party telephone number stored temporarily in CAS 335c is stored automatically into memory addresses 81–90 or third party telephone number information memory 335b in RAM 335 shown in FIG. 7.

When the overall memory area at memory addresses 81–90 is full, the information on the third party telephone number is stored by sequentially shifting the already stored information on the telephone numbers. RAM 335 including memory addresses 81–90 is composed of a FIFO memory. When there is a need to store new information when memory addresses 81–90 are full, older telephone numbers are sequentially erased upon extraction and demodulation of information on the different user's telephone number from WBD.

In this manner, by storing at memory addresses 81–90 the telephone numbers of the third parties who requested an interrupting call during telephonic communication, the telephone numbers in the appropriate address area can thereafter be retrieved.

Especially, the second embodiment of the present invention constructs a system in which retrieval is caused to cooperate with storing one retrieved telephone number again into CAS 335c to thereby retrieve as required the telephone number of the third party who has requested an interrupting call during telephonic communication and to directly call the third party on the basis of that telephone number by depressing the "SND" key.

The operation of the telephone system as the second embodiment responsive to the arrival of an interrupting call during telephonic communication will be described with reference to the flowchart of FIG. 8. Also in this description, the operation of car telephone device 100a responsive to an interrupting call from car telephone device 100n which is the third party when telephone device 100a is in telephonic communication with telephone device 100b is assumed to occur as in the first embodiment. The control provided until car telephone devices 100a and 100b arrive at their telephonic communication is similar to that in the first embodiment.

If there is an interrupting call from telephone device 100n to telephone device 100a when telephone device 100a is in telephonic communication with telephone device 100b, mobile telephone switching office 12a is informed about that fact through control terminal 11.

Thus, in mobile telephone switching office 12a, receiver 123 receives information on the telephone number of telephone device 100n from same due to that call, and WBD generator 124 generates WBD containing that telephone number. Thereafter, this WBD is sent by WBD transfer unit 125 through base station 13b to radio circuit 600.

When telephone device 100a is in telephonic communication with telephone device 100b (S801), the WBD from base station 13a-1 is received by antenna 200, demodulated by demodulator 312, and received by control signal processor 338 through audio unit 337. Control signal processor 338 detects the third party telephone number among the control received and demodulated.

When the telephone number of the third party which has placed the interrupting call during telephonic communication is received (S802), audio unit controller 339 of car telephone device 100a causes speaker 492 to sound, for example twice, the receipt of the interrupting call from the third party on the basis of an instruction from CPU 331 for notifying purposes (S803).

Simultaneously, the third party telephone number received at S802 is transferred from audio/control unit 330 to control unit 418 of handset 400b under control of CPU 331. Thus, control unit 418 then drives LCD driver 454 and displays on liquid crystal display 452 the third party telephone number extracted from audio/control unit 330 of radio device 300 (S804).

At this time, in radio device 300, the third party telephone number information detected by control signal processor 338 is stored in CAS area 335c of RAM 335 (S805). Thereafter, the third party telephone number information is then stored in third party telephone number information storage memory 335b of RAM 335 (S806).

In that case, CPU 331 checks whether the storage locations (at addresses 81–90) in the third party telephone number information storage memory 335b are full (S807). If so (S807, YES), it erases the telephone number information at memory ad dress 90 in memory 335b (S808) and stores the newly received third party telephone number information at memory address 81 (S809).

Therefore, at this time, the last contents at memory address 81 are stored at memory address 82, and the contents at memory addresses 82–89 are similarly shifted to and stored at addresses 83–90 sequentially.

When memory 335b is not full (S807, NO), the newly extracted telephone number is stored at memory address 81 of memory 335b and the last contents at the memory address 81 are shifted to memory address 82, and the contents at memory addresses 82-89 are similarly shifted to addresses 83-90 sequentially (S809).

In the response to the interrupting call mentioned above, terminal 100a which has received the interrupting call during telephonic communication can confirm the third party (car telephone device 100a) which has interrupted the telephonic communication at that time without stopping the telephonic communication by the telephone number displayed on display 452 on handset 400b. In addition, if the user determines that an immediate response to the third party is unnecessary, the telephonic communication maintained so far is continued until same is completed. Thereafter, the third party can be accessed as required.

Figure 8:
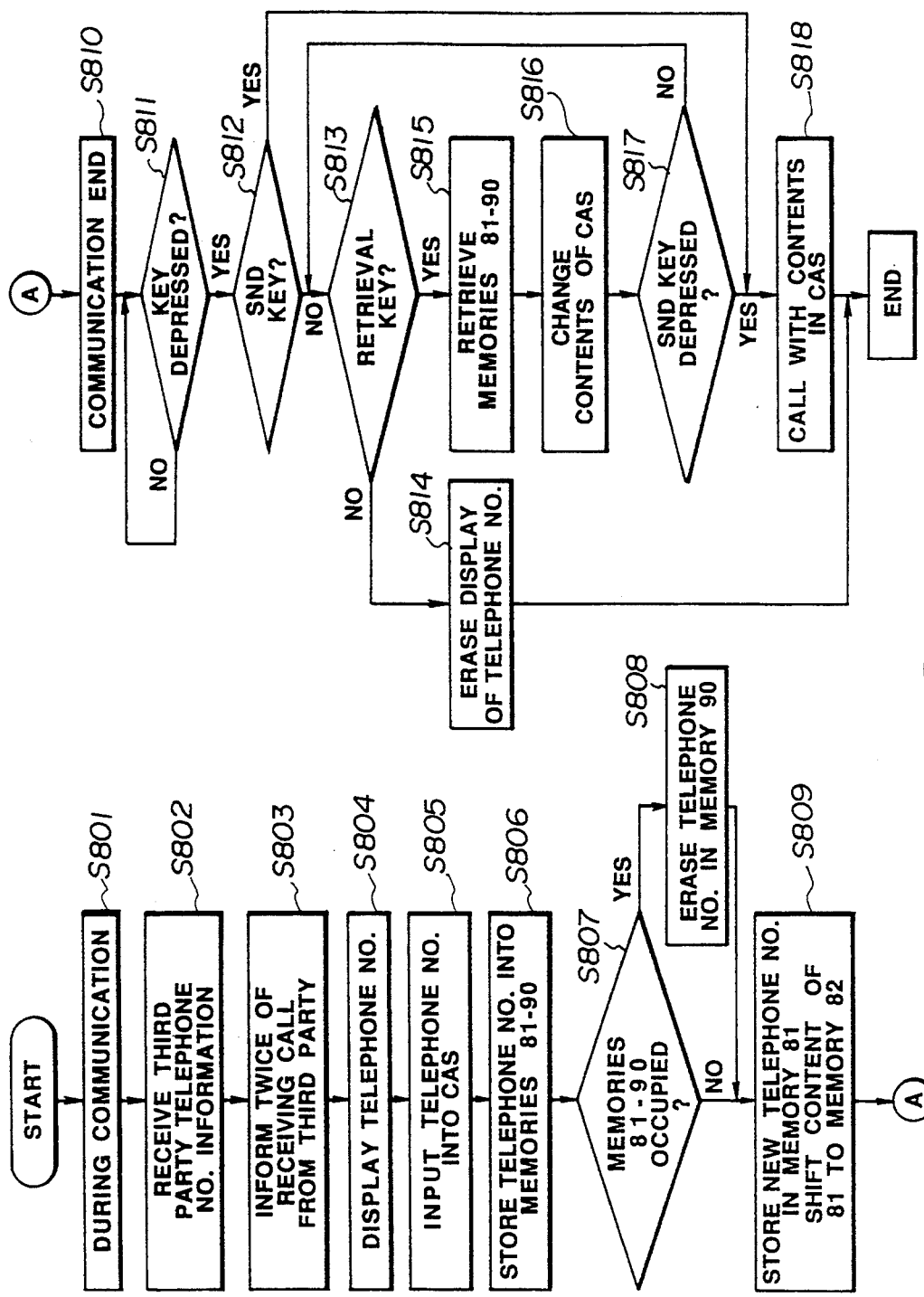
FIG. 8 is a block diagram illustrating the receipt of an incoming call during telephonic communication by the radio telephone device in the telephone system according to the second embodiment.

The flowchart of FIG. 8 corresponds to an operation in which the operator at telephone device 100a has terminated its current communication without responding to the interrupting call in spite of the display of the third party telephone number at S804.

When the current communication has been completed without responding to the interrupting call, display 452 has still displayed the third party interrupting telephone number which is stored in RAM CAS 335c of radio device 300.

Therefore, as measures to be taken after the telephonic communication has been completed in telephone device 100a, the "SND" key on key unit 430 of handset 400b is only depressed as required while the displayed telephone number is being confirmed to thereby call the third party easily on the basis of the contents of RAM CAS 335c at that time.

Thereafter, the contents in CAS 335c are shifted to third party telephone number information storage memory 335b of RAM 335 due to the receipt of the newest telephone number. The memory addresses in memory 335 are, for example, 81-90 and can store information on a plurality of telephone numbers, which is different from CAS 335c which stores information on one telephone number.

Thus, as another function to be fulfilled after the completion of the telephonic communication in telephone device 100a, depression of a predetermined retrieval key will sequentially display and retrieve the contents of memory 335b. In this retrieval, restorage of the telephone number information into RAM CAS 335c in conformity to the display easily brings about placing a call to the retrieved third party by only depression of the "SND" key.

As a further function to be fulfilled after the completion of the telephonic communication in telephone device 100a, if neither of call and retrieval to the third party is required, a key other than the "SND" key and the retrieval key of key unit 430 of handset 400b may be depressed to erase the display of the telephone number on display 452.

After such operative requirements are satisfied and the above telephonic communication has been completed (S810), CPU 331 of radio device 300 monitors whether any key has been depressed in key unit 430 of handset 400b on the basis of a signal informed by control unit 418 through digital interface 340 (S811).

If the key depression is recognized (S811, YES), CPU 331 determines whether the depressed key is "SND" key (S812).

When the depressed key is recognized as the "SND" key (S812, YES), CPU 331 places a call on the basis of the telephone number now displayed on display 452 or the contents in CAS area 335c of RAM 335 (S818).

When the depressed key is not recognized as the "SND" key (S812, NO), CPU 331 determines whether the depressed key is the retrieval key (S813).

If not (S813, NO), CPU 331 erases the telephone number displayed on display 452 (S814).

If the depressed key is determined to be the retrieval key (S813, YES), CPU 331 further retrieves memory addresses 81-90 of RAM 335 or the contents in a memory area corresponding to the third party telephone number information storage memory 335b (S815). At this time, CPU 331 stores the contents at the memory addresses retrieved at step S815 into CAS area 335c for updating purposes (S816).

Thereafter, CPU 331 monitors whether the "SND" key is depressed (S817). If the "SND" key is not depressed, CPU 331 repeatedly performs the processing at S813-S817 to continue retrieval of the contents at memory address 82 and subsequent addresses.

During this operation, if the "SND" key is depressed at S817, CPU places a call on the basis of the contents stored again in CAS 335c in correspondence to the retrieval made at this time (S818).

As just described above, the telephone system of the second embodiment of the present invention displays and stores the information on the telephone number of the interrupting call and, when the stored contents are retrieved and a desired result of the retrieval is obtained, the "SND" key is only depressed on the basis of the retrieved telephone number for calling purposes. Therefore, when an access to the desired third party is desired after the completion of the telephonic communication, it is unnecessary to perform a troublesome operation such as dialing the third party while viewing a memorandum separately or depressing required push buttons separately. Call to the third party after the completion of the telephonic communication is automated to thereby provide a comfortable utilization of the telephone device.

The above respective embodiments show a car telephone system, by itself, to which the present invention is applied. The calling car telephone devices contained in the car telephone system has the function of placing a call with added information on the telephone number of the called party and the telephone number of the calling telephone device when the call is required. In the above respective embodiments, the calling station telephone number sent by that function is sent to the receiving terminal during telephonic communication including the telephone number in the control signals such as WBD so that the terminal under telephonic communication can recognize the third party who has placed the new interrupting call.

When a terminal or network which is capable of placing a call, for example, with added information on the telephone number of the called party and the telephone number of the calling party is presupposed, a telephone system combined with a wire network can be constructed.

A digital network such as, for example, an ISDN network is known as the network which realizes a service including placing a call with added information on the telephone numbers of the calling and called telephone devices.

Figure 9:
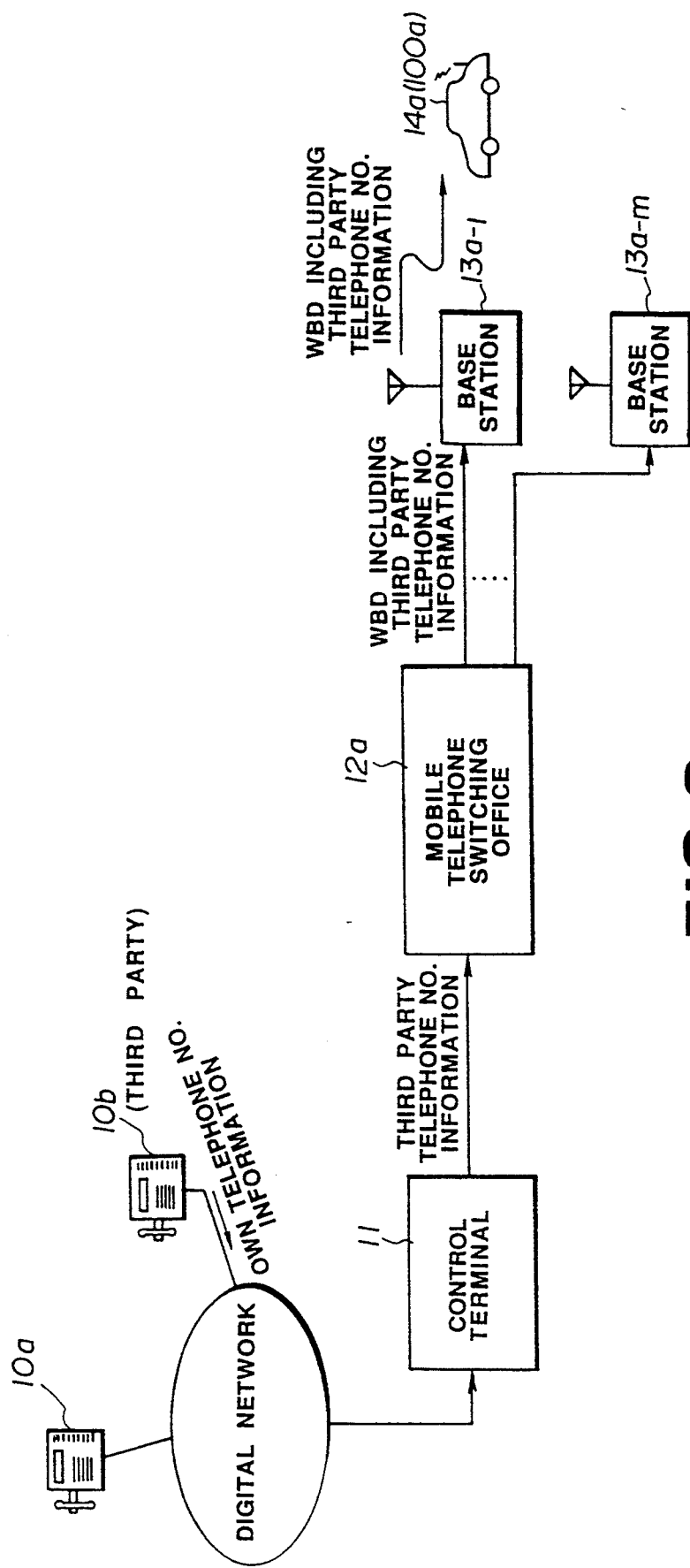
FIG. 9 shows the system structure of a telephone system according to a third embodiment of the present invention.
Figure 10:
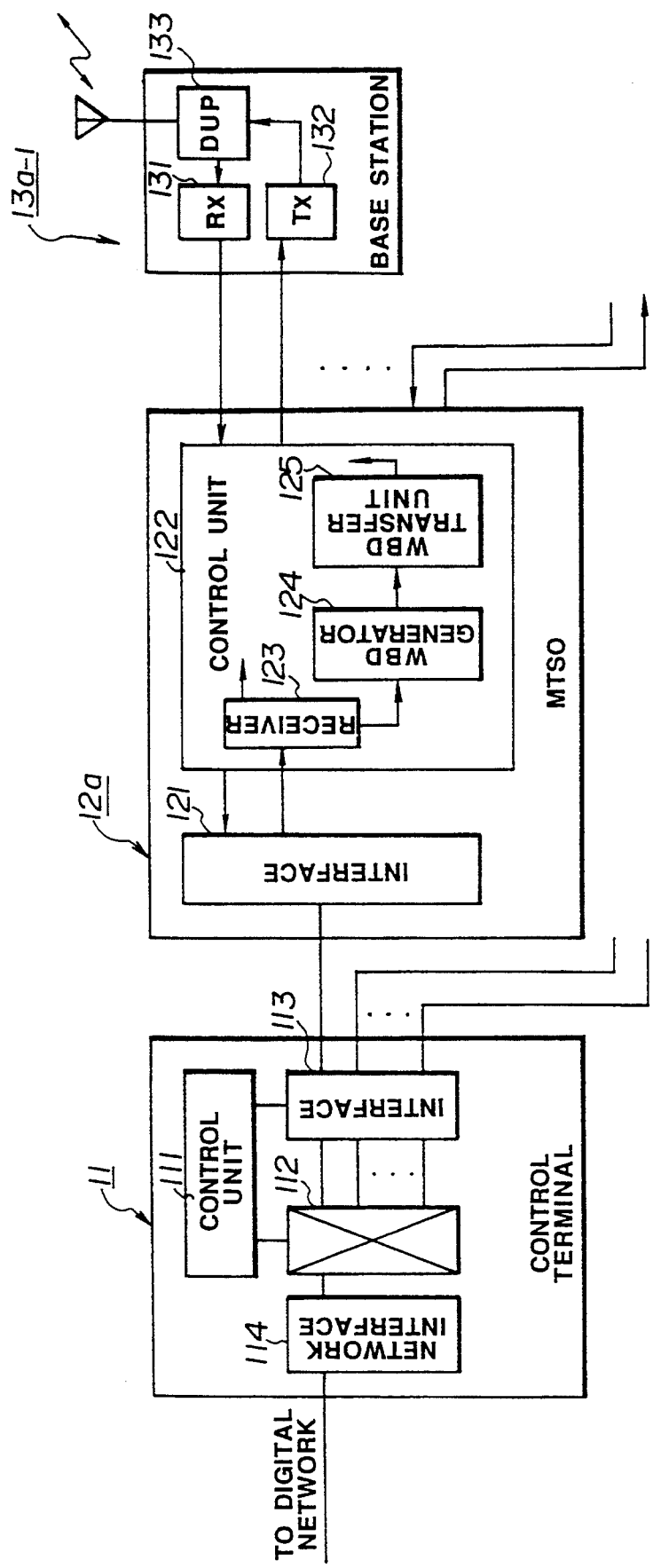
FIG. 10 is a block diagram illustrating a main portion of the telephone system shown in FIG. 9.

FIG. 9 shows the structure of a telephone system as a third embodiment of the present invention and includes the FIG. 1 system and a digital network connected to the control terminal 11 of the FIG. 1 system. In the system of FIG. 9, control terminal 11 is realized by newly providing a network interface 114 for connection to the digital network as shown in FIG. 10.

In the telephone system of the third embodiment, the control unit 111 of control terminal 11 controls exchange of switch unit 112 on the basis of a call from telephone system 10a of the digital network to thereby achieve telephonic communication with a terminal for which the incoming call is received or telephone device 100a as in the respective systems.

if car telephone device 100a in telephonic communication further receives a call from telephone device 10b of the digital network, mobile telephone switching office 12a is informed of this fact through control terminal 11.

Thus, in mobile telephone switching office 12a, call side information receiver 123 receives telephone number information on telephone device 10b fed from same when the call is placed. Then, WBD generator 124 generates WBD containing the information on the telephone number, and WBD transfer unit 125 transfers it to car telephone device 100a through base station 13a-1.

Thereafter, car telephone device 100a can receive and demodulates the information on the telephone number of the third party (telephone device 100b) and display the telephone number under control similar to that provided by the respective embodiments. Therefore, also in the third embodiment, when there is an incoming call during telephonic communication, the third embodiment system produces effects such as recognition of the third party without stopping the current telephonic communication, and similar to those produced in the above respective embodiments.

What is claimed is:

1. A telephone system comprising:
a control terminal having an exchanging function;
a plurality of mobile telephone switching offices connected to the control terminal;
a plurality of base stations each connected to one of the mobile telephone switching offices;
a plurality of radio telephone sets, each having a display unit and an assigned telephone number, each to be connected to one of the mobile telephone switching offices via a radio channel and operable for sending a call signal including the assigned telephone number;
wherein the control terminal includes:
means for controlling a connection between a first radio telephone set and a second radio telephone set,
means for receiving an interrupting call signal from a third radio telephone set directed to the first radio telephone set during the connection between the first radio telephone set and the second radio telephone set,
means for detecting a telephone number of the third radio telephone set included in the interrupting call signal, and
means for transmitting the detected telephone number to the mobile telephone switching office which controls the first radio telephone set,
wherein each of the mobile telephone switching offices include:
means for detecting the assigned telephone number of the third radio telephone set, and
means for generating control information including the detected telephone number,
wherein each of the base stations include means for sending the control information to the first radio telephone set, and
wherein the first radio telephone set includes means for detecting the assigned telephone number of the third radio telephone set in the control information and means for displaying the detected telephone number on the display unit of the first radio telephone set.

2. A telephone system comprising:
a plurality of radio telephone sets;
a plurality of mobile telephone switching offices to be connected to the radio telephone sets through radio channels; and
a control terminal for controlling connection among the radio telephone sets via the mobile telephone switching offices;
wherein the control terminal includes:
means for controlling a connection between a first radio telephone set and a second radio telephone set;
means for receiving an interrupting call signal from a third radio telephone set directed to the first radio telephone set during the connection between the first radio telephone set and the second radio telephone set, the interrupting call signal including identification information of the third radio telephone set;
means for detecting the identification information of the third radio telephone set from the interrupting call signal; and
means for transmitting the detected identification information to a mobile telephone switching office which controls the first radio telephone set;
wherein the mobile telephone switching offices each include:
means for receiving the identification information transmitted from the control terminal;
means for generating a control signal which includes the identification information of the third radio telephone set transmitted from the control terminal; and
means for transmitting the control signal to the first radio telephone set; and
wherein the first radio telephone set includes:
means for receiving the control signal transmitted from the mobile telephone switching office which controls the first radio telephone set during the connection with the second radio telephone set;
means for detecting the identification information of the third radio telephone set from the control signal; and
means for informing a user of the first radio telephone set of the identification information of the third radio telephone set.

* * * * *